(12) United States Patent
Negishi

(10) Patent No.: US 9,221,174 B2
(45) Date of Patent: Dec. 29, 2015

(54) ROBOT CONTROLLING DEVICE, ROBOT APPARATUS, ROBOT CONTROL METHOD, PROGRAM FOR EXECUTING ROBOT CONTROL METHOD, AND RECORDING MEDIUM ON WHICH PROGRAM IS RECORDED

(71) Applicant: CANON KABUSHIKI KAISHA, Tokyo (JP)

(72) Inventor: Mahito Negishi, Tachikawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/376,093

(22) PCT Filed: Feb. 28, 2013

(86) PCT No.: PCT/JP2013/056202
§ 371 (c)(1),
(2) Date: Jul. 31, 2014

(87) PCT Pub. No.: WO2013/133346
PCT Pub. Date: Sep. 12, 2013

(65) Prior Publication Data
US 2015/0025684 A1 Jan. 22, 2015

(30) Foreign Application Priority Data
Mar. 7, 2012 (JP) ................................. 2012-050503

(51) Int. Cl.
*G05B 19/04* (2006.01)
*G05B 19/18* (2006.01)
(Continued)

(52) U.S. Cl.
CPC .............. *B25J 9/1656* (2013.01); *B25J 9/1664* (2013.01); *G05B 19/4103* (2013.01); *G05B 2219/39358* (2013.01); *Y10S 901/02* (2013.01); *Y10S 901/28* (2013.01)

(58) Field of Classification Search
USPC ............... 700/28, 32, 34, 245, 250, 252, 262; 901/2, 28, 1, 31, 3, 8, 14, 15, 16, 19, 901/20, 22, 30, 32, 36, 38; 701/23; 318/569
See application file for complete search history.

(56) References Cited

U.S. PATENT DOCUMENTS 3,882,304 A * 5/1975 Walters .............. G05B 19/4103
318/569
4,623,971 A * 11/1986 Ailman .............. G05B 19/4103
318/561
(Continued)

FOREIGN PATENT DOCUMENTS

CN 101508112 A 8/2009
CN 101898358 A 12/2010
(Continued)

OTHER PUBLICATIONS

U.S. Appl. No. 14/335,761, filed by Mahito Negishi Jul. 18, 2014.
(Continued)

Primary Examiner — Ronnie Mancho
(74) Attorney, Agent, or Firm — Fitzpatrick, Cella, Harper & Scinto

(57) ABSTRACT

Disclosed is a technique that reduces the amount of calculation necessary for time optimal control. An interpolation function calculating part 361 calculates an interpolation function that passes through a plurality of interpolated teach points for interpolation between respective teach points. Further, a differential coefficient calculating part 362 calculates each differential coefficient obtained by differentiating each vector component included each interpolated teach point by a variable number of the interpolation function. Further, an estimated value calculating part 365 calculates an estimated velocity of each joint in each interpolated teach point on the basis of each pass velocity and each differential coefficient. Further, a time optimal controlling part 369 changes the respective pass velocities and minimizes an objective function obtained by integrating reciprocal numbers of the respective pass velocities by a variable number under a constraint condition including a condition that the ratio of the estimated velocity of each joint and a predetermined allowable velocity is within a predetermined constraint range. A position command generating part 373 generates a position command by substituting, whenever a pass velocity function is time-integrated by a value of a predetermined time interval, a value of the integration in the variable number in the interpolation function.

15 Claims, 8 Drawing Sheets

(51) Int. Cl.
   *B25J 9/00* (2006.01)
   *B25J 9/16* (2006.01)
   *G05B 19/4103* (2006.01)

(56) References Cited

U.S. PATENT DOCUMENTS

| | | | |
|---|---|---|---|
| 4,894,595 A * | 1/1990 | Sogawa et al. | 318/568.24 |
| 4,937,759 A * | 6/1990 | Vold | 700/262 |
| 4,975,856 A * | 12/1990 | Vold et al. | 700/263 |
| 5,243,266 A | 9/1993 | Kasagami et al. | |
| 5,327,058 A | 7/1994 | Rembutsu | |
| 5,723,961 A * | 3/1998 | Fujino | G05B 19/4103 318/568.15 |
| 6,092,004 A * | 7/2000 | Harima | G05B 19/4103 318/568.15 |
| 6,212,443 B1 | 4/2001 | Nagata et al. | |
| 6,472,839 B1 * | 10/2002 | Ishii et al. | 318/568.12 |
| 7,146,242 B2 * | 12/2006 | Weinhofer | B25J 9/1664 318/35 |
| 7,180,253 B2 * | 2/2007 | Weinhofer | B25J 9/1664 318/34 |
| 7,591,171 B2 | 9/2009 | Negishi | |
| 7,915,787 B2 | 3/2011 | Negishi et al. | |
| 8,245,317 B2 | 8/2012 | Negishi | |
| 8,447,561 B2 | 5/2013 | Negishi | |
| 8,478,439 B2 * | 7/2013 | Nishibashi | G05B 19/4141 318/599 |
| 8,744,625 B2 | 6/2014 | Negishi | |
| 8,774,965 B2 | 7/2014 | Weiss et al. | |
| 8,843,237 B2 | 9/2014 | Aurnhammer et al. | |
| 2005/0240307 A1 * | 10/2005 | Kuroki et al. | 700/245 |
| 2007/0293962 A1 * | 12/2007 | Kimura | G05B 19/4103 700/97 |
| 2010/0204828 A1 | 8/2010 | Yoshizawa et al. | |
| 2012/0029699 A1 | 2/2012 | Jing et al. | |

FOREIGN PATENT DOCUMENTS

| | | |
|---|---|---|
| CN | 102039596 A | 5/2011 |
| DE | 4101422 C2 | 6/1993 |
| DE | 3885640 T2 | 3/1994 |
| DE | 69217420 T2 | 9/1997 |
| DE | 69622572 T2 | 4/2003 |
| JP | 11-198072 A | 7/1999 |

OTHER PUBLICATIONS

International Preliminary Report on Patentability, dated Sep. 18, 2014 for International Appln No. PCT/JP2013/056202.
Haruhisa, Kono, Robot Kinematics, Jun. 10, 2005, Ohmsha, Tokyo, pp. 42 and 91.
Chinese Office Action dated Jul. 3, 2015 for counterpart Chinese Patent Appln No. 201380012677.0.
German Office Action dated Aug. 20, 2015 for counterpart German Patent Application No. 112013003029.2.

* cited by examiner $^1p_i$ TEACH POINT OF FIRST ROBOT ARM $^2p_i$ TEACH POINT OF SECOND ROBOT ARM

ROBOT CONTROLLING DEVICE, ROBOT APPARATUS, ROBOT CONTROL METHOD, PROGRAM FOR EXECUTING ROBOT CONTROL METHOD, AND RECORDING MEDIUM ON WHICH PROGRAM IS RECORDED

TECHNICAL FIELD

The present invention relates to a robot controlling device, a robot apparatus, a robot control method, a program for executing the robot control method and a recording medium on which the program is recorded that generate a position command in which an operation time is the shortest when an articulated robot moves along a trajectory given by teach points.

BACKGROUND ART

In recent years, the development of an assembly apparatus having an articulated robot that is capable of realizing complicated and high-speed assembly like human hands has been increased. In this regard, a high-speed operation of the articulated robot is important.

Further, in order to cope with a complicated and precise assembly target, it is necessary to cope with a complicated CP (Continuous Path) trajectory that connects three or more teach points instead of a simple PTP (Point To Point) trajectory that connects two teach points.

A technique of time optimal control of an articulated robot that satisfies this necessity has been proposed (refer to PTL 1). The time optimal control has been proposed in treatises since 1980s, and is well known. According to the technique disclosed in PTL 1, in order to output a position command (target position) with respect to each joint of the articulated robot at a predetermined time interval (for example, at an interval of 1 ms), interpolation is performed between respective given teach points at a predetermined time interval to calculate the position command. Then, a value of each position command is corrected to minimize an operation time.

CITATION LIST

Patent Literature

PTL 1: Japanese Patent Application Laid-Open No. H11-198072

SUMMARY OF INVENTION

Technical Problem

However, in the technique disclosed in PTL 1, the amount of calculation necessary for the time optimal control is large. Specifically, in the technique disclosed in PTL 1, the position command indicating the target position is calculated on the basis of each teach point, a calculation of the time optimal control is performed for the calculated position command, and then, the corrected position command is generated.

In order to suppress reduction of speed and position accuracy of the articulated robot, it is necessary to output the position command at a predetermined minute (for example, several milliseconds) time interval, and thus, the amount of data is large. For example, when the articulated robot is operated for 10 seconds and the position command is output at an interval of 1 ms, 10×1000=10000 corrected position commands are necessary. Thus, the amount of data subject to a calculation process in the time optimal control is necessarily large. Further, the time optimal control returns to a matter of optimization for solution, which demands a calculation time. Thus, the increase in the amount of data results in increase in the calculation time. During the calculation process, it is difficult to operate the articulated robot, which causes a problem that it is difficult to perform a high-speed operation of the articulated robot that is the object of the time optimal control.

Accordingly, an object of the invention is to reduce the amount of calculation necessary for time optimal control.

Solution to Problem

According to an aspect of the invention, there is provided a robot controlling device that outputs a position command at a predetermined time interval to a drive controlling unit that controls an operation of each actuator for driving each joint of an articulated robot so that each joint is operated to sequentially follow a plurality of teach points including a teach position of each joint as a vector component, including a calculating unit, wherein the calculating unit executes: an interpolation function calculation process of calculating an interpolation function that passes through a plurality of interpolated teach points for interpolation between the respective teach points; a differential coefficient calculation process of calculating each differential coefficient obtained by differentiating each vector component included in each interpolated teach point by a variable number of the interpolation function; a temporary setting process of temporarily setting each pass velocity indicating a differential value obtained by time-differentiating the variable number in each interpolated teach point; an estimated value calculation process of calculating an estimated velocity of each joint in each interpolated teach point on the basis of each pass velocity and each differential coefficient; a time optimal control process of changing the respective pass velocities and minimizing an objective function obtained by integrating reciprocal numbers of the respective pass velocities by the variable number under a constraint condition including a condition that the ratio of the estimated velocity of each joint and a predetermined allowable velocity is within a predetermined constraint range; a pass velocity function calculation process of calculating a pass velocity function from each pass velocity obtained in the time optimal control process; and a position command generation process of generating the position command by substituting, whenever the pass velocity function is time-integrated by a value of the predetermined time interval, a value of the integration in the variable number in the interpolation function.

According to another aspect of the invention, there is provided a robot control method using a robot controlling device including a calculating unit that generates a position command to be output at a predetermined time interval to a drive controlling unit that controls an operation of each actuator for driving each joint of an articulated robot so that each joint is operated to sequentially follow a plurality of teach points including a teach position of each joint as a vector component, the method including: an interpolation function calculation process of calculating an interpolation function that passes through a plurality of interpolated teach points for interpolation between the respective teach points, by the calculating unit; a differential coefficient calculation process of calculating each differential coefficient obtained by differentiating each vector component included in each interpolated teach point by a variable number of the interpolation function, by the calculating unit; a temporary setting process of temporarily setting each pass velocity indicating a differential value obtained by time-differentiating the variable number in each interpolated teach point, by the calculating unit; an estimated value calculation process of calculating an estimated velocity of each joint in each interpolated teach point on the basis of each pass velocity and each differential coefficient, by the calculating unit; a time optimal control process of changing the respective pass velocities and minimizing an objective function obtained by integrating reciprocal numbers of the respective pass velocities by the variable number under a constraint condition including a condition that the ratio of the estimated velocity of each joint and a predetermined allowable velocity is within a predetermined constraint range, by the calculating unit; a pass velocity function calculation process of calculating a pass velocity function from each pass velocity obtained in the time optimal control process, by the calculating unit; and a position command generation process of generating the position command by substituting, whenever the pass velocity function is time-integrated by a value of the predetermined time interval, a value of the integration in the variable number in the interpolation function, by the calculating unit.

Advantageous Effects of Invention

According to the invention, the time optimal control process of changing each pass velocity with respect to the variable number of the interpolation function in each interpolated teach point so as to minimize the objective function is performed, and the position command at each predetermined time interval is generated from the interpolation function using each pass velocity calculated in this manner. In this way, since the position command is calculated after the objective function is minimized, it is not necessary to set the number of interpolated teach points to be the same as the number of position commands, and it is possible to set the number of the interpolated teach points to be smaller than the number of position commands. Thus, it is possible to reduce the amount of calculation necessary for the time optimal control process, and to enhance the calculation speed for calculation of the position command in the calculating unit.

Further features of the present invention will become apparent from the following description of exemplary embodiments with reference to the attached drawings.

DESCRIPTION OF EMBODIMENTS

Hereinafter, embodiments for realizing the present invention will be described in detail with reference to the accompanying drawings.

First Embodiment

Figure 1:
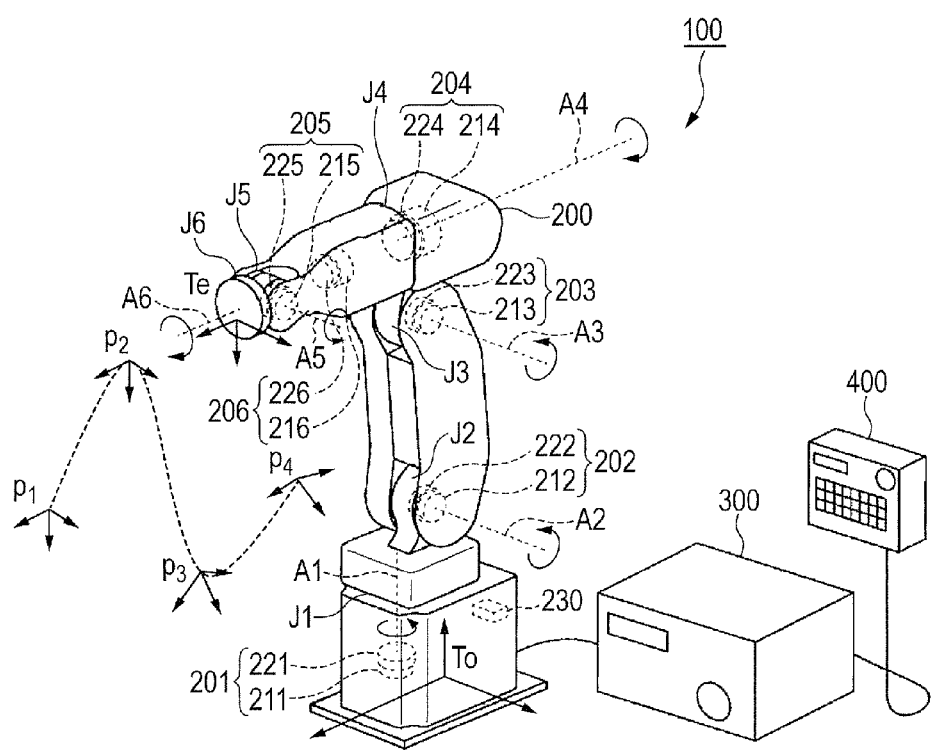
FIG. 1 is a diagram schematically illustrating a configuration of a robot apparatus according to a first embodiment of the present invention.

FIG. 1 is a diagram schematically illustrating a configuration of a robot apparatus according to a first embodiment of the present invention. The robot apparatus 100 illustrated in FIG. 1 includes a robot arm 200 that is an articulated robot, and a robot controlling device 300 that controls the robot arm 200. Further, the robot apparatus 100 includes a teaching pendant 400 that is a teaching device that transmits data on a plurality of teach points to the robot controlling device 300. The teaching pendant 400 is operated by a user, and is used for designating an operation of the robot arm 200 or the robot controlling device 300.

The robot arm 200 is a robot having 6 joints in the first embodiment. The robot arm 200 includes a plurality of (6) actuators 201 to 206 that rotatably drives respective joints J1 to J6 around respective joint axes A1 to A6, respectively. The robot arm 200 may enable an endpoint (tip of the robot arm) to be directed in an arbitrary three-directional posture at an arbitrary three-dimensional position as long as the robot arm 200 is in a movable range. Generally, the position and posture of the robot arm 200 may be expressed by a coordinate system. In FIG. 1, To represents a coordinate system fixed to a pedestal of the robot arm 200, and Te represents a coordinate system fixed to the endpoint of the robot arm 200.

In the present embodiment, the actuators 201 to 206 respectively include electric motors 211 to 216 and reducers 221 to 226 connected to the electric motors 211 to 216. A configuration of each of the actuators 201 to 206 is not limited thereto, and for example, an artificial muscle or the like may be used.

In the first embodiment, a case where the respective joints J1 to J6 are rotational joints will be described. In this case, the term "joint position" refers to a joint angle. Each joint may be a prismatic joint. In this case, the "joint position" is the position of the prismatic joint. Similarly, with respect to time differentiation thereof, the terms "joint velocity", "joint acceleration" and "joint jerk" are used.

The robot arm 200 further includes a servo control device 230 that is a drive controlling unit that controls driving of the electric motors 211 to 216 of the respective actuators 201 to 206. The servo control device 230 outputs current commands to the electric motors 211 to 216, and controls the operations of the respective electric motors 211 to 216 so that the positions of the respective joints J1 to J6 follow position commands on the basis of input position commands (target positions).

The robot controlling device 300 receives an input of a plurality of teach points (teach point sequence) from the teaching pendant 400. The robot controlling device 300 generates position commands to be output to the servo control device 230 at predetermined time intervals on the basis of the teach points, and outputs the position commands at the predetermined time intervals so that the respective joints J1 to J6 of the robot arm 200 are operated to sequentially follow the plurality of teach points.

The teach point is a vector (teach point vector) including the teach positions of the respective joints (six joints) J1 to J6 as a vector component. Further, the position command that is finally calculated in the robot controlling device 300 is a vector including the target positions of the respective joints (six joints) J1 to J6 as a vector component. In the first embodiment, the teach point and the position command are different from each other in the number of points, but their dimensions (units) are the same.

That is, the robot controlling device 300 calculates a CP trajectory from the input teach points to generate the plurality of position commands along the trajectory, and outputs the position commands to the servo control device 230 at predetermined time intervals.

At this time, the robot controlling device 300 performs a time optimal control of the articulated robot for adjusting the pass velocity on the trajectory in a range without deviating from constraint conditions such as velocities, accelerations, torques and the like of the respective joints J1 to J6 of the robot arm 200, with respect to the trajectory determined by the given teach point sequence.

Here, two types of methods may be considered as an operation method of the robot arm 200 through teaching.

1 Motion in Configuration Space

Method for designating teach points at joint angles of the robot arm 200 and moving the robot along a trajectory determined by the designated teach points.

2 Motion in Task Space

Method for designating teach points at three-dimensional positions and postures, and moving the robot arm 200 along a trajectory determined by the designated teach points and the endpoint of the robot arm 200.

In FIG. 1, four teach points p1, p2, p3 and p4 are schematically illustrated. The operation of the robot arm 200 moves along a trajectory determined by the teach points in any case. Here, the teach points are not points in a so-called three-dimensional space. In the case of joint space movement, the teach points correspond to joint angles of all the joints J1 to J6 (rotational angles of all the motors). In the case of task space movement, the teach points correspond to the position and posture in the three-dimensional space, in which p1, p2, p3 and p4 are expressed as a coordinate system, as illustrated in FIG. 1.

Hereinafter, in the first embodiment, the case of joint space movement will be described. In the joint space movement, the teach points correspond to angles of the respective joints J1 to J6 of the robot. Accordingly, in the case of a 6-axis and 6-joint robot, six vector components are included in one teach point.

Figure 2:
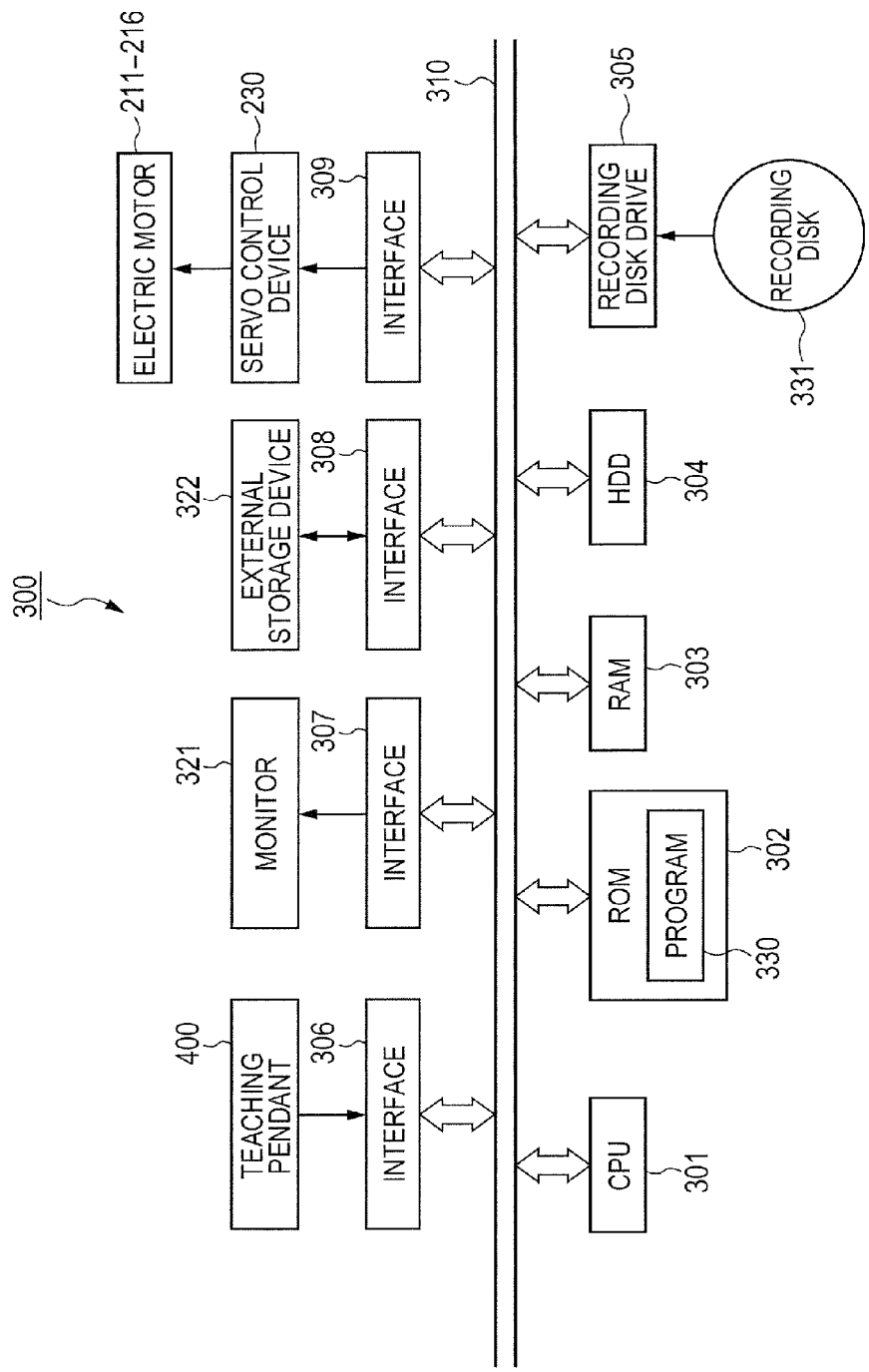
FIG. 2 is a block diagram illustrating a configuration of a robot controlling device.

FIG. 2 is a block diagram illustrating a configuration of the robot controlling device 300. In the first embodiment, the robot controlling device 300 is a computer that includes a CPU 301 that is a calculating unit, as illustrated in FIG. 2.

The robot controlling device 300 includes the CPU 301 that is the calculating unit, a ROM 302, a RAM 303, an HDD 304, a recording disk drive 305, and various interfaces 306 to 309.

The ROM 302, the RAM 303, the HDD 304, the recording disk drive 305 and the various interfaces 306 to 309 are connected to the CPU 301 through a bus 310. A program 330 for operating the CPU 301 is stored in the ROM 302. The program 330 is a program that causes the CPU 301 to execute various calculation processes. The CPU 301 executes the various calculation processes on the basis of the program 330 stored in the ROM 302. The RAM 303 is a storage unit that temporarily stores the calculation process result of the CPU 301. The HDD 304 is a storage unit for storing various types of data that is the calculation process result.

The teaching pendant 400 is connected to the interface 306, and the CPU 301 receives an input of data on the teach points from the teaching pendant 400 through the interface 306 and the bus 310.

Data (position command data) indicating the calculation result in the CPU 301 or the like is stored in the HDD 304 under the command of the CPU 301.

The servo control device 230 of the robot arm 200 is connected to the interface 309, and the CPU 301 outputs the position command data to the servo control device 230 through the bus 310 and the interface 309 at predetermined time intervals.

A monitor 321 is connected to the interface 307, and various images are displayed on the monitor 321. The interface 308 is configured so that an external storage device 322 such as a rewritable nonvolatile memory or an external HDD may be connected thereto. The recording disk drive 305 is able to read various types of data, programs or the like recorded in a recording disk 331.

Figures 3, 3A:
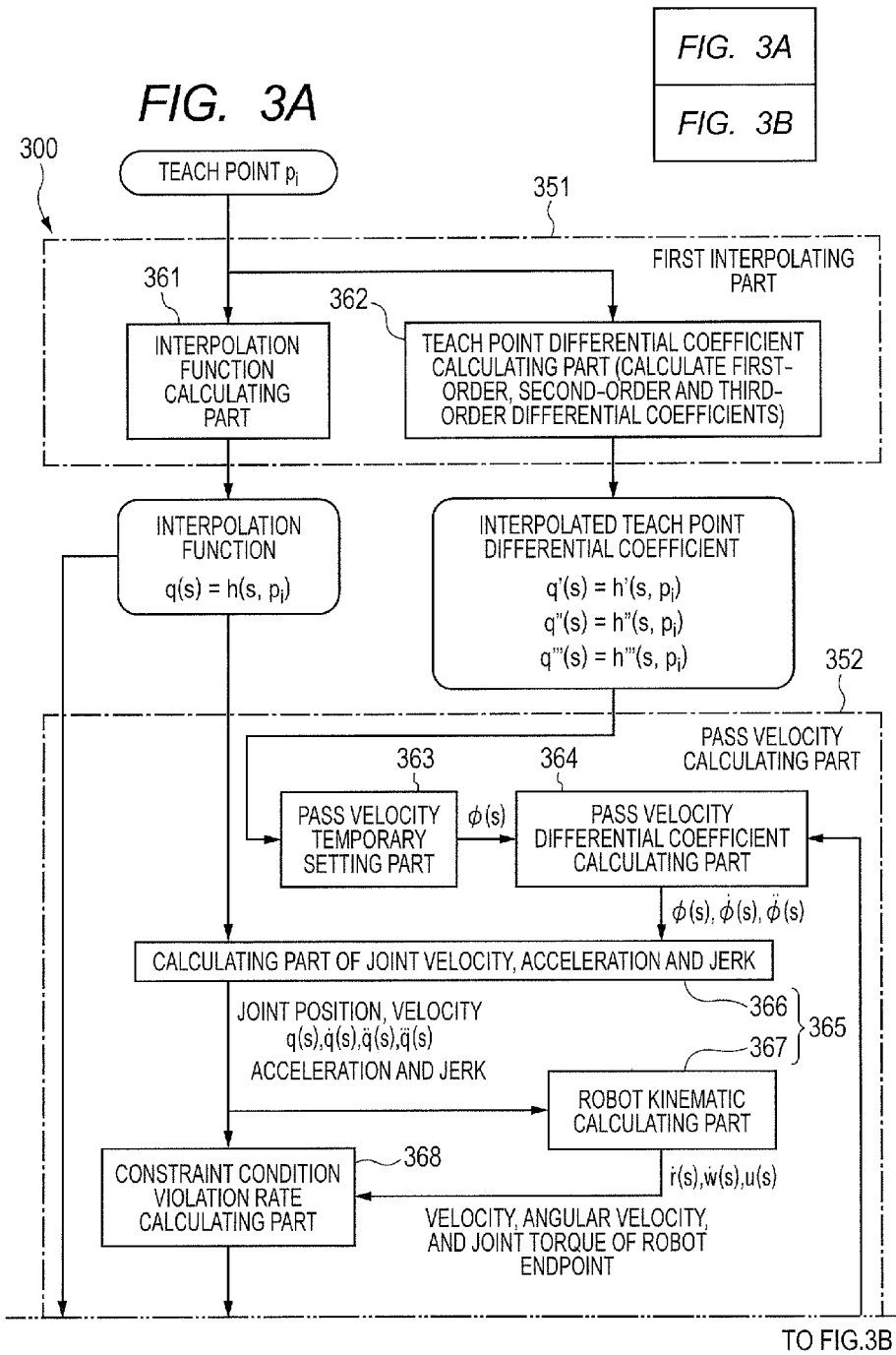
FIG. 3 which is composed of FIGS. 3A and 3B is a functional block diagram of a robot controlling device.
Figure 3B:
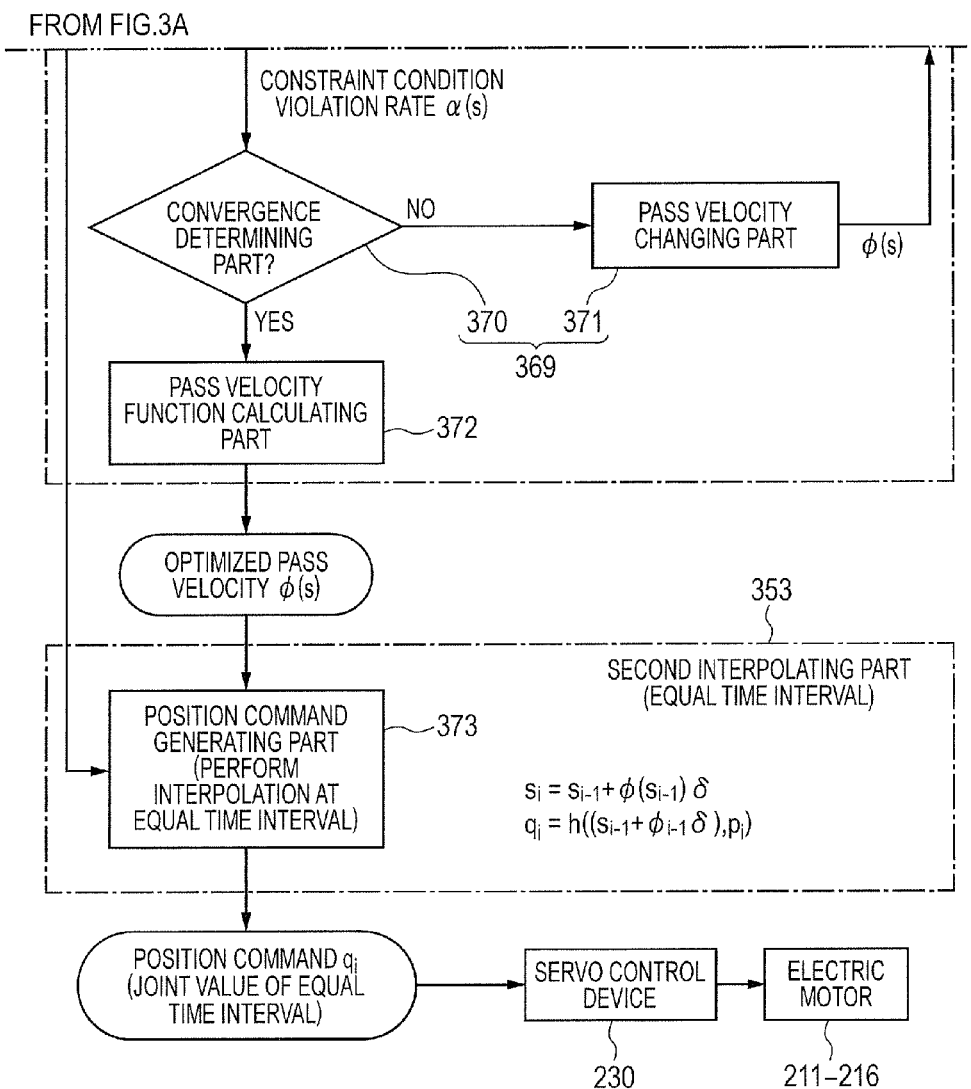

FIG. 3 is a functional block diagram illustrating the robot controlling device 300. The CPU 301 executes the program 330 stored in the ROM 302, to function as various processing parts 351, 352 and 353 that execute various processes to be described later. That is, the CPU 301 functions as a first interpolating part 351, a pass velocity calculating part 352, a second interpolating part 353 illustrated in FIG. 3, on the basis of the program 330. In FIG. 3, rounded rectangles represent data, and rectangles represent processes of the CPU 301.

Operations of the respective parts 351, 352 and 353 will be briefly described. First, the first interpolating part 351 performs interpolation between the respective teach points using an interpolation function, and calculates positions of the respective joints in respective positions of the interpolated teach points. Further, the first interpolating part 351 calculates a first-order differential value, a second-order differential value, and a third-order differential value.

The pass velocity calculating part 352 defines the pass velocity in each position of the interpolated teach points. Then, the pass velocity calculating part 352 calculates a first-order differential value of the pass velocity and a second-order differential value of the pass velocity. The pass velocity calculating part 352 calculates estimated velocity, estimated acceleration, estimated jerk and estimated torque of each joint of the robot arm 200 from the first-order differential value and the second-order differential value of the pass velocity and the position of each joint, the first-order differential value, the second-order differential value and the third-order differential value calculated in the first interpolating part 351. Further, the pass velocity calculating part 352 calculates an estimated tip velocity of the tip of the robot arm 200 (hereinafter, referred to as an estimated endpoint velocity), and an estimated rotational velocity of the tip of the robot arm 200 (hereinafter, referred to as an estimated endpoint rotational velocity).

Then, the pass velocity calculating part 352 calculates a constraint condition violation rate that is the ratio of the calculated estimated velocity, estimated acceleration, estimated jerk, estimated torque and estimated endpoint velocity and estimated endpoint rotational velocity, and predetermined constraint values.

The pass velocity calculating part 352 solves an inequality constraint optimization problem that an inequality constraint in which the entire or a pre-selected part of the calculated constraint condition violation rate is within a predetermined constraint range (within a range of ±1) is satisfied and the sum of reciprocal numbers of the pass velocities, that is, an operating time is the shortest, to thereby obtain the pass velocity.

The second interpolating part 353 calculates the position command to each joint of the robot arm 200 in a position obtained by integrating the calculated pass velocity at predetermined time intervals, using the interpolation function.

Here, signs in a mathematical expression are defined as follows. In the mathematical expression, boldface represents vectors.

$p_i$ Teach point. Vector formed by a plurality of vector components.

In the case of a robot arm having 6-axis joints, one teach point is formed by six teach positions (joint angles).

$h(s, p_i)$ Interpolation function.

$q(s)$ Interpolated teach point. Vector formed by a plurality of vector components.

In the case of a robot arm having 6-axis joints, one interpolated teach point is formed by six teach positions (joint angles).

s Variable number indicating serial number of respective interpolated teach points. Here, s is not an integer but a real number.

$$q'(s) = \frac{\partial q(s)}{\partial s},$$
$$q''(s) = \frac{\partial^2 q(s)}{\partial s^2},$$
$$q'''(s) = \frac{\partial^2 q(s)}{\partial s^2}$$

First-order, second-order and third-order differential coefficients differentiated by the variable number s in interpolated teach points.

$\phi(s) = \partial s / \partial t$

Pass velocity.

$$T_{all} = \int_s \frac{\partial t}{\partial s} ds = \int_s \frac{1}{\phi(s)} ds$$

Entire necessary time.

$$\dot{q}(s) = \frac{\partial q(s)}{\partial t}$$

Estimated velocity of joint (first-order differentiation of time).

$$\ddot{q}(s) = \frac{\partial^2 q(s)}{\partial t^2}$$

Estimated acceleration of joint (second-order differentiation of time).

$$\dddot{q}(s) = \frac{\partial^3 q(s)}{\partial t^3}$$

Estimated jerk of joint (third-order differentiation of time).

$a_n$ Constraint condition violation rate.

$q_i$ Position command. Target position to be transmitted to servo control device at each predetermined time interval.

$\dot{r}(s)$ Estimated endpoint velocity of robot arm (velocity of coordinate system Te in FIG. 1).

$\dot{w}(s)$ Estimated endpoint rotational velocity of robot arm (angular velocity of coordinate system Te in FIG. 1).

$u(s)$ Estimated torque applied to joint of robot arm.

Hereinafter, the operations of the respective parts 351, 352 and 353 will be described in detail with reference to FIGS. 3, 4 and 5. As illustrated in FIG. 3, the first interpolating part 351 includes an interpolation function calculating part 361 and a differential coefficient calculating part 362. The pass velocity calculating part 352 includes a temporary setting part 363, a pass velocity differential coefficient calculating part 364, an estimated value calculating part 365, a constraint condition violation rate calculating part 368, a time optimal controlling part 369, and a pass velocity function calculating part 372. The second interpolating part 353 includes a position command generating part 373. The estimated value calculating part 365 includes a calculating part 366 and a kinematic calculating part 367. The time optimal controlling part 369 includes a convergence determining part 370 and a pass velocity changing part 371.

Figure 4A:
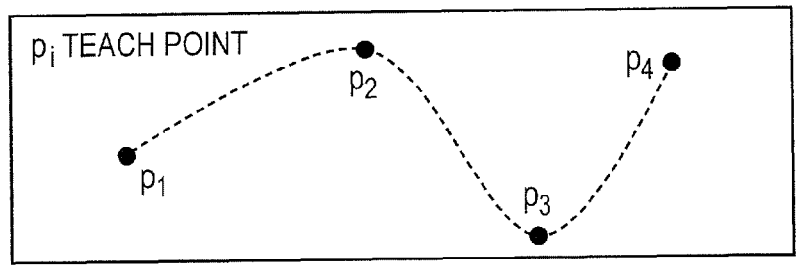
FIG. 4A is a diagram schematically illustrating a teach point.

First, the interpolation function calculating part 361 executes an interpolation function calculation process of calculating an interpolation function that passes through a plurality of interpolated teach points (vectors) q(s) for interpolation between respective teach points (vectors) pi (interpolation function calculation process). For example, in a case where four teach points p1 to p4 illustrated in FIG. 4A are obtained, the interpolation function calculating part 361 calculates an interpolation function that passes through the plurality of interpolated teach points q(1), q(2), . . . illustrated in FIG. 4B, for interpolation between four teach points p1 to p4. The teach point p1 is a start point, and the teach point p4 is an end point.

Here, a variable number s is a variable number that is a serial number in the respective interpolated teach points, that is, a variable number that is a serial number that is assigned to the respective interpolated teach points in the order of passage, which takes a real value in the interpolation function.

Figure 4B:
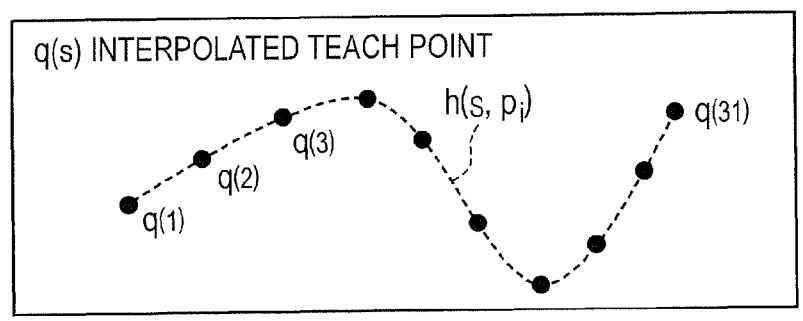
FIG. 4B is a diagram schematically illustrating an interpolated teach point and an interpolation function.

In FIG. 4B, the interpolation function is schematically represented by a dotted line. Various interpolations such as a linear interpolation, circular interpolation or spline interpolation are proposed as the interpolation function, and may be expressed by the following expression (1).

$$q(s) = h(s, p_i) \quad (1)$$

Here, the variable number s becomes a number of each interpolated teach point q(s) in a case where the variable number s is used as an integer value. For example, in a case where each section between the respective teach points p1 to p4 are divided into ten pieces, interpolated teach points q(1) to q(31) that are divided into 31 are obtained. Further, the variable number s may take values of continuous numbers (real values) instead of an integer in interpolation.

It is preferable that the interpolation function be a polynomial equation of the variable number s. In the first embodiment, since calculation is performed later up to a three-order differential coefficient, the interpolation function is given as the following formula (2) as a three-dimensional polynomial equation.

$$h(s, pi) = a_3 s^3 + a_2 s^2 + a_1 s^1 + a_0 \quad (2)$$

Respective coefficients (vectors) a0, a1, a2 and a3 in the polynomial equation shown in formula (2) are selected as different values for each pi-pi-1 section. In the present embodiment, the respective coefficients are selected as continuous values up to a secondary differential coefficient in a boundary of the section.

As the interpolation function, an interpolation function that passes through each teach point pi and an interpolation function that does not pass through each teach point pi are used. That is, the interpolation function is not limited to an interpolation function that necessarily passes through all the teach points.

In this way, the interpolation function calculating part 361 calculates the respective coefficients a0, a1, a2 and a3 shown in formula (2) to obtain the interpolation function, and obtains the respective interpolated teach points q(1), q(2), . . . by substituting s=1, 2, . . . in the variable number s of the interpolation function.

Here, since the interpolated teach points q(1), q(2), . . . are used for calculating the pass velocity to be described later, it is not necessary to increase the number of their points as much as the number of position commands. For example, it is sufficient to divide the section between the teach points pi-pi-1 into ten pieces. The number of the interpolated teach points q(s) is set to be smaller than the number of the position commands output to the servo control device 230. For example, the robot arm 200 allows four teach points p1 to p4 illustrated in FIG. 4A to move for 10 seconds, and in a case where the position commands are output to the servo control device 230 at a predetermined time interval of 1 ms, position commands of 10÷0.001=10000 points are necessary. In this regard, if each section between the teach points p1 to p4 is divided into ten pieces, the number of the interpolated teach points q(s) becomes 31, and thus, it is possible to remarkably reduce the number of the position commands.

Next, the differential coefficient calculating part 362 executes a differential coefficient calculation process of respectively calculating differential coefficients obtained by differentiating the respective vector components indicating the teach positions included in the respective interpolated teach points q(1), q(2), . . . by the variable number s of the interpolation function (differential coefficient calculation process).

Here, in a method for temporarily calculating differences between the interpolated teach points q(1) to q(31), an interpolation error is increased, which is not used for a high-order differentiation.

In the first embodiment, since the differentiation is performed up to the three-order differentiation, the simple difference formula in the related art is not used, but the function obtained by directly differentiating the interpolation function is used. That is, if the formula (2) is subject to the first-order differentiation, the second-order differentiation and the third-order differentiation by the variable number s, respectively, the following formula (3) is obtained.

$$q'(s) = \frac{\partial q(s)}{\partial s} \quad (3)$$
$$= \frac{\partial h(s, p_i)}{\partial s}$$
$$= 3a_3 s^2 + 2a_2 s + a_1$$

$$q''(s) = \frac{\partial^2 q(s)}{\partial s^2}$$
$$= \frac{\partial^2 h(s, p_i)}{\partial s^2}$$
$$= 6a_3 s + 2a_2$$

$$q'''(s) = \frac{\partial^3 q(s)}{\partial s^3}$$
$$= \frac{\partial^3 h(s, p_i)}{\partial s^3}$$
$$= 6a_3$$

Accordingly, in the first embodiment, the differential coefficient calculating part 362 calculates the first-order differential coefficient, the second-order differential coefficient and the third-order differential coefficient using the formula (3), as differential coefficients obtained by differentiating the respective vector components in the respective interpolated teach points q(1) to q(31) by the variable number s. That is, the differential coefficient calculating part 362 calculates the differential coefficients in the respective interpolated teach points by substituting s=1, 2, . . . , 31 in the variable number s of the formula (3).

Next, the temporary setting part 363 executes a temporary setting process of temporarily setting the pass velocity indicating the differential value (first-order differential coefficient) obtained by time-differentiating the variable number s in the respective interpolated teach points q(1) to q(31), respectively (temporary setting process). In the respective interpolated teach points q(1) to q(31), each pass velocity represents a velocity at which the variable number s is changed.

Figure 4C:
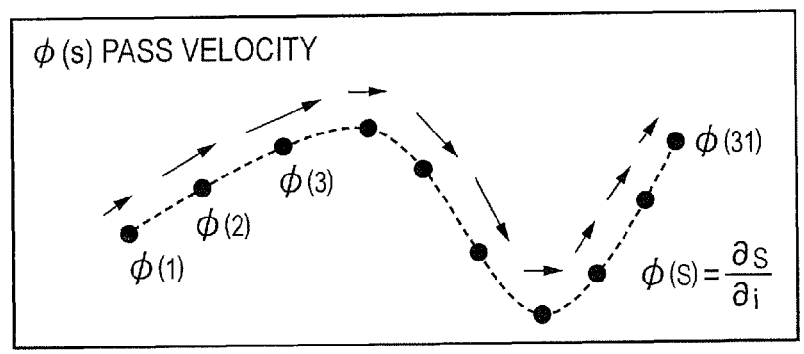
FIG. 4C is a diagram schematically illustrating a pass velocity.

For example, the respective pass velocities are initially set (temporarily set) as φ(1) to φ(31) in the respective interpolated teach points, as illustrated in FIG. 4C. The pass velocities φ(s) are defined by the following formula.

$$\phi(s) = \partial s / \partial t$$

For example, the respective pass velocities φ(1) to φ(31) are set to a predetermined number as follows, for example.

$$\phi(s) = 1$$

This means a passage through one interpolated teach point for 1 second.

Next, the pass velocity differential coefficient calculating part 364 executes a calculation process of calculating the differential coefficients (in the present embodiment, the first-order differentiation and the second-order differentiation) obtained by differentiating the respective pass velocities φ(1) to φ(31) in the respective interpolated teach points q(1) to q(31) by the variable number s.

In the pass velocity differential coefficient calculation process, the calculation process is performed on the basis of the following formula (4).

$$\phi'(s) = \frac{\partial \phi(s)}{\partial s} \quad (4)$$

$$\phi''(s) = \frac{\partial^2 \phi(s)}{\partial s^2}$$

Next, the calculating part 366 executes an estimated value calculation process of calculating estimated velocities, estimated accelerations and estimated jerks of the respective joints J1 to J6 of the robot arm 200 on the basis of the respective pass velocities and the respective differential coefficients (estimated value calculation process). That is, the calculating part 366 calculates the estimated velocities, the estimated accelerations and the estimated jerks on the basis of values of the respective pass velocities $\phi(s)$ (including differential coefficients $\phi'(s)$ and $\phi''(s)$ calculated on the basis of these values) and values of the respective differential coefficients $q'(s)$, $q''(s)$ and $q'''(s)$. Here, s=1, 2, . . . , 31.

Specifically, the calculating part 366 substitutes the respective calculation results in the following formula (5) to calculate an estimated velocity $q(\bullet)(s)$, an estimated acceleration $q(\bullet\bullet)(s)$ and an estimated jerk $q(\bullet\bullet\bullet)(s)$. The estimated velocity $q(\bullet)(s)$, the estimated acceleration $q(\bullet\bullet)(s)$ and the estimated jerk $q(\bullet\bullet\bullet)(s)$ are vectors.

$$\dot{q}(s) = q'(s)\phi(s)$$

$$\ddot{q}(s) = q''(s)\phi(s)^2 + q'(s)\phi'(s)\phi(s)$$

$$\dddot{q}(s) = q'''(s)\phi(s)^3 + 3q''(s)\phi'(s)\phi(s)^2 + q'(s)\phi(s)(\phi'(s)^2 + \phi(s)\phi''(s)) \quad (5)$$

The estimated acceleration is a value obtained by first-order differentiating the estimated velocity by time, and the estimated jerk is a value obtained by second-order differentiating the estimated velocity by time.

Next, the kinematic calculating part 367 executes an estimated value calculation process of calculating estimated torques of the respective joints in the respective interpolation teach points, an estimated endpoint velocity of the robot arm 200 and an estimated endpoint rotational velocity of the robot arm 200 on the basis of the respective pass velocities and the respective differential coefficients.

Specifically, the kinematic calculating part 367 calculates an estimated torque (vector) $u(s)$ applied to the joint from the interpolated teach point (joint teach position) $q(s)$, the estimated velocity $q(\bullet)(s)$ and the estimated acceleration $q(\bullet\bullet)(s)$.

This calculation is known as an inverse dynamic calculation of the robot arm 200. For example, referring to Kono Haruhisa, Robot Kinematics, Jun. 10, 2005, Ohmsha (Tokyo), Page 91, the following formula (6) is obtained.

$$u(s) = I(q(s))\ddot{q}(s) + C(q(s),\dot{q}(s))\dot{q}(s) + G(q(s)) + J(q(s))f \quad (6)$$

On the right side, the first term is referred to as an inertia term, the second term is referred to as a Coriolis term, the third item is referred to as a gravity term, and the fourth term is referred to as an external force term. These are calculated from arrangements, masses and inertia tensors of links that form the robot arm 200, and positions $q(s)$, estimated velocities $q(\bullet)(s)$ and estimated accelerations $q(\bullet\bullet)(s)$ of respective joints.

Further, the kinematic calculating part 367 calculates an estimated endpoint velocity (vector) $r(\bullet)(s)$ and an estimated endpoint rotational velocity (vector) $w(\bullet)(s)$ of the robot arm 200, from the interpolated teach point $q(s)$ and the estimated velocity $q(\bullet)(s)$ of the respective joints of the robot arm 200.

This calculation is known as a forward kinematic calculation, and is simply obtained using a Jacobian matrix T. For example, referring to Kono Haruhisa, Robot Kinematics, Jun. 10, 2005, Ohmsha (Tokyo), Page 42, the following formula (7) is obtained.

$$\begin{bmatrix} \dot{r}(s) \\ \dot{w}(s) \end{bmatrix} = [T(q(s))]\dot{q}(s) \quad (7)$$

In this way, the kinematic calculating part 367 calculates the estimated torque applied to the joint from the estimated values of the position, velocity, acceleration and jerk of the joint, the mass and inertia tensor of each joint of the robot, using the formula (6). Further, the kinematic calculating part 367 calculates the estimated endpoint velocity and the estimated endpoint rotational velocity of the robot arm 200 using the formula (7).

Next, the constraint condition violation rate calculating part 368 executes a constraint condition violation rate calculation process of calculating a constraint condition violation rate of a joint velocity that is the ratio of an estimated velocity of each joint and a predetermined allowable velocity. That is, the constraint condition violation rate calculating part 368 calculates the following formula.

$$\frac{\dot{q}_j(s)}{V_j}$$

(ratio of velocity $\dot{q}_j(s)$ of j-th joint axis of robot and allowable velocity $V_j$)

In the case of a 6-axis articulated robot, j=1 to 6. The respective estimated velocities are calculated on the basis of the respective pass velocities ($\phi(s)$) and the respective differential coefficients ($q'(s)$) using the formula (5).

Further, the constraint condition violation rate calculating part 368 executes a constraint condition violation rate calculation process of calculating a constraint condition violation rate of a joint acceleration that is the ratio of an estimated acceleration of each joint and a predetermined allowable acceleration. That is, the constraint condition violation rate calculating part 368 calculates the following formula.

$$\frac{\ddot{q}_j(s)}{A_j}$$

(ratio of acceleration $\ddot{q}_j(s)$ of j-th joint axis of robot and allowable acceleration $A_j$)

In the case of a 6-axis articulated robot, j=1 to 6. The respective estimated accelerations are calculated on the basis of the respective pass velocities ($\phi(s)$ and values $\phi'(s)$ of first-order differentiation of respective pass velocities) and the respective differential coefficients ($q'(s)$ and $q''(s)$) using the formula (5).

Further, the constraint condition violation rate calculating part 368 executes a constraint condition violation rate calculation process of calculating a constraint condition violation rate of a joint jerk that is the ratio of an estimated jerk of each joint and a predetermined allowable jerk. That is, the constraint condition violation rate calculating part 368 calculates the following formula.

$$\frac{\dddot{q}_j(s)}{B_j}$$

(ratio of jerk $\dddot{q}_j(s)$ of j-th joint axis of robot and allowable jerk $B_j$)

In the case of a 6-axis articulated robot, j=1 to 6. The respective estimated jerks are calculated on the basis of the respective pass velocities ($\phi(s)$, values $\phi'(s)$ of first-order differentiation and values $\phi''(s)$ of second-order differentiation) and the respective differential coefficients (q'(s), q''(s) and q'''(s)) using the formula (5).

Further, the constraint condition violation rate calculating part 368 executes a constraint condition violation rate calculation process of calculating a constraint condition violation rate of a torque applied to the joint that is the ratio of an estimated torque of each joint and a predetermined allowable torque. That is, the constraint condition violation rate calculating part 368 calculates the following formula.

$$\frac{u_j(s)}{U_j}$$

(ratio of torque $u_j(s)$ applied to in j-th joint of robot and allowable torque $U_j$)

In the case of a 6-axis articulated robot, j=1 to 6. The respective estimated torques are calculated on the basis of the respective interpolated teach points q(s), the respective pass velocities ($\phi(s)$ and values $\phi'(s)$ of first-order differentiation of respective pass velocities) and the respective differential coefficients (q'(s) and q''(s)).

Further, the constraint condition violation rate calculating part 368 executes a constraint condition violation rate calculation process of calculating a constraint condition violation rate of an endpoint velocity that is the ratio of an estimated tip velocity of the tip of the robot arm 200 in each interpolated teach point and a predetermined allowable tip velocity. That is, the constraint condition violation rate calculating part 368 calculates the following formula.

$$\frac{\dot{r}(s)}{R}$$

(ratio of estimated tip velocity r(s) and allowable tip velocity R)

Here, the estimated tip velocity is the size of the velocity vector of the tip of the robot arm 200. That is, the estimated tip velocity is as follows.

$$r(s)=\sqrt{r_x(s)^2+r_y(s)^2+r_z(s)^2}$$

The respective estimated tip velocities are calculated on the basis of the respective interpolated teach points q(s), the respective pass velocities $\phi(s)$ and the respective differential coefficients q'(s) using the formula (7).

Further, the constraint condition violation rate calculating part 368 executes a constraint condition violation rate calculation process of calculating a constraint condition violation rate of an endpoint rotational velocity that is the ratio of an estimated rotational velocity of the tip of the robot arm 200 in each interpolated teach point and a predetermined allowable rotational velocity. That is, the constraint condition violation rate calculating part 368 calculates the following formula.

w(s)/W(ratio of estimated rotational velocity w(s) and allowable rotational velocity W)

Here, the estimated rotational velocity is the size of the rotational velocity vector of the endpoint. That is, the estimated rotational velocity is as follows.

$$w(s)=\sqrt{w_x(s)^2+w_y(s)^2+w_z(s)^2}$$

The respective estimated rotational velocities are calculated on the basis of the respective interpolated teach points q(s), the respective pass velocities $\phi(s)$ and the respective differential coefficients q'(s) using the formula (7).

For description, the above-mentioned constraint condition violation rate is expressed as follows.

$$\alpha_n(s)$$

Here, n represents the type of the constraint condition violation rate. In the first embodiment, there are 6+6+6+6+1+1=26 types of the constraint condition violation rates. A predetermined constraint range of the constraint conditions is set as in the following formula (8) using these constraint condition violation rates.

$$\alpha_n(s)-1\le0$$

$$-\alpha_n(s)-1\le0 \quad (8)$$

It is necessary that a constraint condition violation rate $\alpha n(s)$ be in the range of ±1 in order to satisfy the constraint. That is, it is necessary to satisfy the two formulas.

Further, a time necessary for the robot arm 200 to move from the start point of the teach points to the end point thereof is determined using an objective function of the following formula (9) by integrating reciprocal numbers of the respective pass velocities with the variable number s.

$$T_{all} = \int_s \frac{\partial t}{\partial s}ds = \int_s \frac{1}{\phi(s)}ds \quad (9)$$

The problem of minimizing the objective function of the formula (9) in a range where the inequality constraint of the formula (8) is satisfied using the pass velocity as a parameter is known as an inequality constraint optimal value problem, and various analyses have been proposed. For example, the following method for minimizing the Lagrangian function is used.

$$L(\phi(s)) = T_{all} + \rho\left(\sum_n \max(\alpha_n - 1, 0) + \sum_n \max(-\alpha_n - 1, 0)\right) \quad (10)$$

Here, $\rho$ is referred to as a penalty parameter.

In the first embodiment, the time optimal controlling part 369 executes a time optimal control process of changing the respective pass velocities under the constraint condition that the constraint condition violation rate $\alpha n(s)$ is in the range of ±1 to minimize the objective function of formula (9) (time optimal control process).

Specifically, first, the convergence determining part 370 of the time optimal controlling part 369 determines that convergence is completed when the next two conditions are satisfied.

A first condition is a condition that all the constraint condition violation rates $\alpha n(1), \alpha n(2), \ldots, \alpha n(31)$ are within ±1, that is, the first condition satisfies the formula (8).

A second condition is a condition that the pass velocity distributions $\phi(1), \phi(2), \ldots, \phi(31)$ are changed within a predetermined small amount $\epsilon$, compared with the previous pass velocity distributions $\phi(1), \phi(2), \ldots, \phi(31)$, that is, the second condition satisfies the following formula (11).

$$|\phi(s)-\phi_0(s)|<\epsilon \quad (11)$$

In a case where there is no data on the previous pass velocity distributions $\phi0(1), \phi0(2), \ldots, \phi0(31)$ (that is, in a first repetition process), the convergence determining part 370 performs determination using only the first condition in convergence determination.

In a case where the convergence determining part 370 determines that there is no convergence, the pass velocity changing part 371 of the time optimal controlling part 369 executes a process of changing values of the respective pass velocities on the basis of the formula (10). Further, the pass velocity differential coefficient calculating part 364, the estimated value calculating part 365 and the constraint condition violation rate calculating part 368 execute the above-mentioned respective calculation processes using the changed respective pass velocities. Repetition of these processes is performed until the convergence determining part 370 determines that there is the convergence. As described above, the time optimal controlling part 369 optimizes the pass velocity so that the objective function of the formula (9) is minimized in the range where the inequality constraint condition of the formula (8) is satisfied.

Next, in a case where the convergence determining part 370 determines that there is the convergence in convergence determination, the pass velocity function calculating part 372 executes a pass velocity function calculation process of calculating a pass velocity function from the respective pass velocities obtained in the time optimal control process (pass velocity function calculation process).

Next, the position command generating part 373 executes a position command generation process of generating position commands by substituting, whenever the calculated pass velocity function is time-integrated by a predetermined time interval value δ, the integrated value in the variable number s in the interpolation function (position command generation process).

Figure 5:
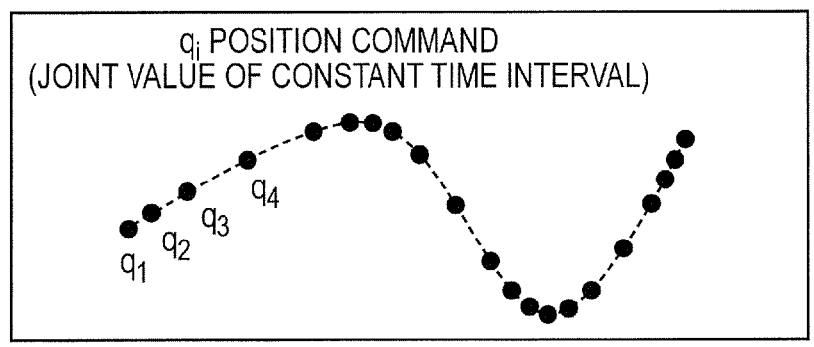
FIG. 5 is a diagram schematically illustrating a position command.

FIG. 5 illustrates an example of the position command calculated in the position command generating part 373. The position command generating part 373 integrates the pass velocity function φ(s) at the predetermined time interval δ (for example, 1 ms) to calculate a teach point number s, and calculates a position command indicating a joint value at the position using the interpolation function. Here, it is not necessary to perform the differential coefficient calculation, differently from the first interpolating part 351. This calculation may be simply expressed using the simplest integral formula, as follows.

$$s_{i+1} = s_i + \phi(s_i)\delta \quad (12)$$

$$q_{i+1} = h(s_{i+1}, p_i) \quad (13)$$

Here, a subscript i represents the number of the command value calculated at each predetermined time interval δ. Further, an initial value of the variable number s is zero, as follows.

$$s_0 = 0$$

The position command generating part 373 calculates a position $s_{i+1}$ of a teach point after the predetermined time interval δ in the formula (12), and calculates a position command (vector) $q_{i+1}$ of each joint in the formula (13). Since the position command $q_i$ at each constant time interval calculated in this way is a solution of the inequality constraint optimal value problem mentioned in the formulas (8) and (9), the robot arm 200 is operated at the shortest time.

Hereinbefore, in the first embodiment, the time optimal control process of changing the respective pass velocities φ(1), φ(2), ..., φ(31) with respect to the variable number s of the interpolation function in the respective interpolated teach points so that the objective function is minimized, is performed. Further, using the respective pass velocities φ(1), φ(2), ..., φ(31) calculated in this way, position commands q1, q2, ... at each predetermined time interval are generated from the interpolation function. Here, the number of the interpolated teach points to be used in the time optimal control is determined by the first interpolating part 351. Generally, the inequality constraint optimal value problem takes a calculation time, but the number of the interpolated teach points may be set to be smaller than the number of the position commands sent at an equal time interval in the servo control device 230 that is finally generated. For example, if the number of the integrated teach points is 31 and the number of the position commands is 10000, since the ratio is 31/10000, that is, about 0.3%, it is possible to remarkably reduce the amount of calculation.

In this way, in the first embodiment, since the position commands q1, q2, ... are calculated after performing minimization of the objective function, it is not necessary to set the number of the interpolated teach points to be the same as the number of the position commands, and it is possible to set the number of the interpolated teach points to be smaller than the number of the position commands. Thus, it is possible to reduce the amount of calculation necessary for the time optimal control process, and it is possible to reduce the calculation time for calculation of the position commands in the CPU 301 to enhance the calculation speed, compared with the related art.

Further, the differential coefficient of each interpolated teach point is once calculated by the differential coefficient calculating part 362 and is considered as a constant in the pass velocity calculating part 352, and thus, the amount of calculation is small, and the calculation time is reduced.

Further, in the related art, the constraint condition is only a condition that a constraint condition violation rate of an estimated velocity of a joint of a robot arm is within a range of a predetermined constraint condition. On the other hand, in the first embodiment, the constraint condition includes conditions that the constraint condition violation rates of the estimated velocity, the estimated acceleration, the estimated jerk, the estimated torque, the estimated endpoint velocity and the estimated endpoint rotational velocity of the joint of the robot arm 200 are within the predetermined constraint condition range illustrated in the formula (8). Accordingly, it is possible to cope with wide constraint conditions compared with the related art, and the operation of the robot arm 200 is stabilized. For example, since the constraint condition includes the condition that the ratio of the estimated jerk and the predetermined allowable jerk is within the predetermined constraint range, it is possible to suppress an abnormal exciting force from being applied to the robot arm 200, and to suppress noticeable vibration of the robot arm 200.

In the first embodiment, an example in which the third-order spline is used as the interpolation function has been described, but the interpolation function may be calculated by a fourth or higher order spline interpolation, or a polynomial equation interpolation. Further, the interpolation function may be calculated by a linear interpolation, a circular interpolation or the like.

Further, in the first embodiment, the process of generating the position command at each constant time from the plurality of teach points is performed as a series of continuous operations, but may be performed as two stages divided midway as follows.

The processes of the first interpolating part 351 and the pass velocity calculating part 352 are continuously performed as a calculation process A to calculate the pass velocity φ(s).

A position command at each constant time is generated from the pass velocity φ(s) and the teach point by the second interpolating part 353 (position command generating part 373), as a calculation process B.

The calculation process A is an optimized calculation and has a large amount of calculation, and is thus calculated before the robot arm 200 is operated. Since the latter calculation process B has a small amount of calculation, it is possible to perform the process while actually moving the robot arm 200. In this case, the time when the robot arm 200 is stopped for calculation corresponds to the processing time of the calculation process A.

That is, compared with a method of moving the robot arm 200 after all the calculation processes A and B are finished, it is possible to reduce the stopping time of the robot arm 200.

Second Embodiment

Figure 6:
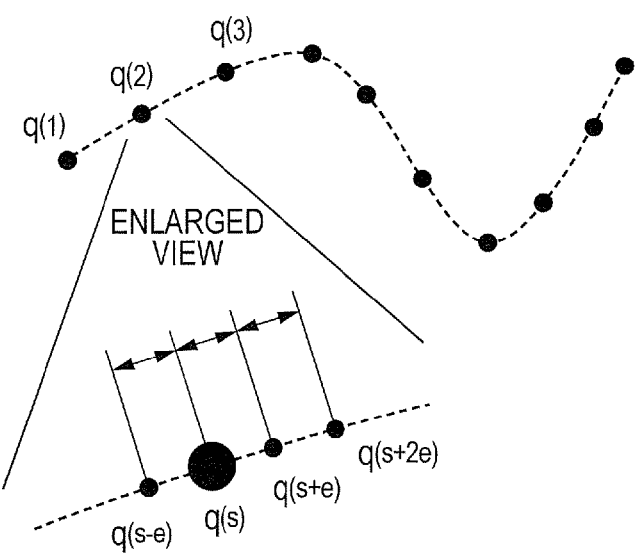
FIG. 6 is a diagram schematically illustrating an operation of a differential coefficient calculating part of a robot controlling device according to a second embodiment of the present invention.

Next, a robot controlling device according to a second embodiment of the invention will be described. FIG. 6 is a diagram schematically illustrating an operation of a differential coefficient calculating part of a robot controlling device according to the second embodiment of the invention. In the second embodiment, only the calculation process of the differential coefficient calculating part 362 (FIG. 3) is different from the first embodiment. Accordingly, in the second embodiment, the calculation process of the differential coefficient calculating part 362 will be described.

In the first embodiment, the case of "motion in configuration space" has been described as an example. In the second embodiment, the case of "motion in task space" will be described. The second embodiment is different from the first embodiment in the interpolation function shown in the formula (1).

In the case of "motion in task space", the interpolation function interpolates teach points expressed in a task space, and then calculates inverse kinematics of the robot arm 200 and converts the result into a joint space to calculate interpolated teach points. At this time, since a complicated inverse kinematic calculation is performed, it is difficult to analytically calculate differential coefficients.

In the second embodiment, similar to the first embodiment, the CPU 301 (FIG. 2) that is a calculating unit functions as the differential coefficient calculating part 362 on the basis of the program 330.

Further, in the second embodiment, the differential coefficient calculating part 362 performs numerical differentiation in order to cope with a case where it is difficult to analytically differentiate the interpolation function. Here, in the second embodiment, since the number of interpolated teach points is reduced by roughly performing interpolation, if the numerical differentiation is simply performed by values between the interpolated teach points, interpolation errors are increased. Thus, the differential coefficients are obtained at respective positions that are divided for interpolation.

The differential coefficient calculating part 362 calculates respective vector components on the basis of the interpolation function when the variable number s is changed into a minute value e smaller than the interval of the respective interpolated teach points with respect to the respective vector components of the respective interpolated teach points q(1) to q(31), as the differential coefficient calculation process. Further, the differential coefficient calculating part 362 calculates the respective differential coefficients using the calculated result. Specifically, the differential coefficient calculating part 362 calculates a first-order differential value, a second-order differential value and a third-order differential value of the vector components in the respective interpolated teach points q(1) to q(31).

Specifically, first, the differential coefficient calculating part 362 four-point-calculates values of the interpolation function in s=1, 2, . . . , 31 and values of the interpolation function at positions where the variable numbers s are shifted by the minute value e, with respect to the respective values s.

$$q(s) = h(s, p_i)$$

$$q(s+e) = h(s+e, p_i)$$

$$q(s-e) = h(s-e, p_i)$$

$$q(s+2e) = h(s+2e, p_i) \quad (14)$$

Next, the differential coefficient calculating part 362 calculates the first-order differential value, the second-order differential value and the third-order differential value in the following formula (15).

$$q'(s) = \frac{h(s+e, p_i) - h(s-e, p_i)}{2e} \quad (15)$$

$$q''(s) = \frac{h(s+e, p_i) + h(s-e, p_i) - 2h(s, p_i)}{e^2}$$

$$q'''(s) = \frac{h(s+2e, p_i) - 3h(s+e, p_i) + 3h(s, p_i) - h(s-e, p_i)}{e^3}$$

The above formula (15) is an example, and various types of other numerical differential formulas are known. According to this method, even in the case of the interpolation function that is difficult to analytically differentiate, it is possible to calculate the first-order differential value, the second-order differential value and the third-order differential value with high accuracy, and to perform a time optimal control.

Third Embodiment

Next, a robot apparatus according to a third embodiment of the invention will be described. In the third embodiment, a robot apparatus 100B is a robot having multiple joints, and includes two robot arms 200a and 200b, and a robot controlling device 300B that controls the robot arms 200a and 200b. In the third embodiment, in a calculation process of a CPU that is a calculating unit, the third embodiment is different from the first and second embodiments in the interpolation function calculation process of calculating the interpolation function, but is the same as the first and second embodiments in the other calculation processes.

Accordingly, in the third embodiment, the robot controlling device 300B uses two robot arms 200a and 200b as a control target, and except for the interpolation function calculation process in the respective robot arms, the same processes as those of the first and second embodiments are performed.

In manual assembly, a plurality of elements such as both arms or hands is synchronously moved. Similarly, in the robot controlling device of the robot arm, synchronous operations of the plurality of robot arms should be realized.

In the third embodiment, similar to the first and second embodiment, the CPU 301 (FIG. 2) that is a calculating unit functions as the interpolation function calculating part 361 on the basis of the program 330.

Further, in the third embodiment, the interpolation function calculating part 361 assigns a teach point number corresponding to a time at each teach point and calculates an interpolation function by a spline interpolation using the teach point number, as an interpolation function calculation process.

Specifically, the interpolation function calculating part 361 sets teach point numbers that monotonically increase in the teach points of each teach point sequence, and calculates an interpolation function that performs interpolation between the teach points of the teach point sequence by an unequal spacing spline using the teach point numbers.

Figure 7A:
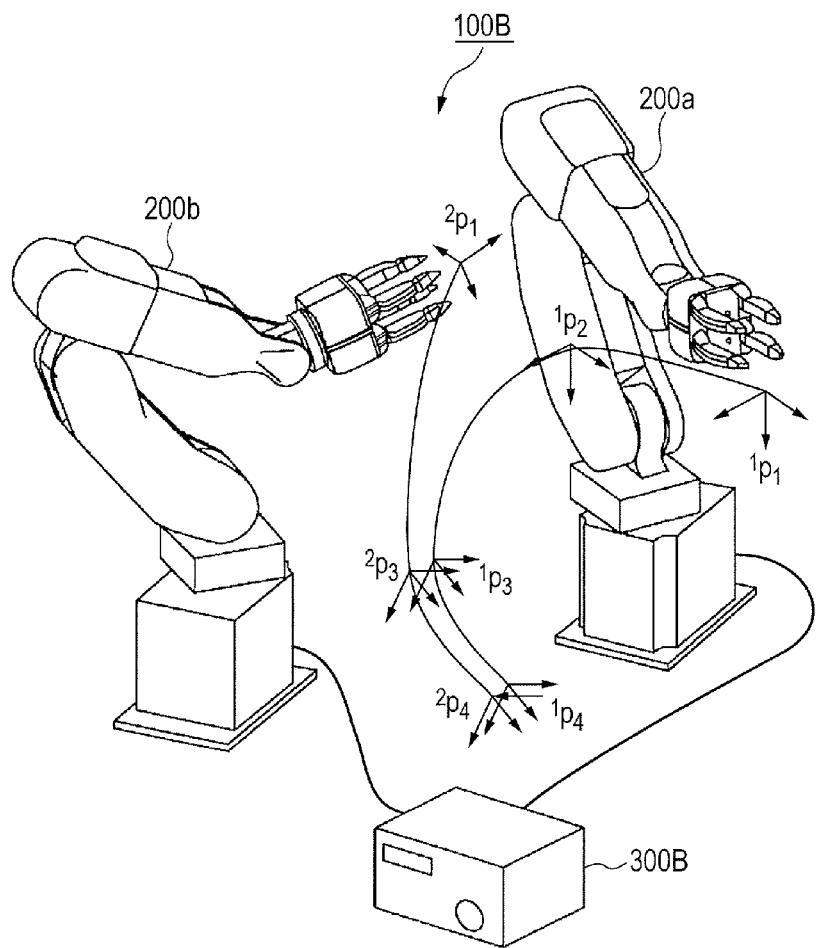
FIG. 7A is a diagram schematically illustrating a structure of a robot apparatus according to a third embodiment of the present invention.
Figure 7B:
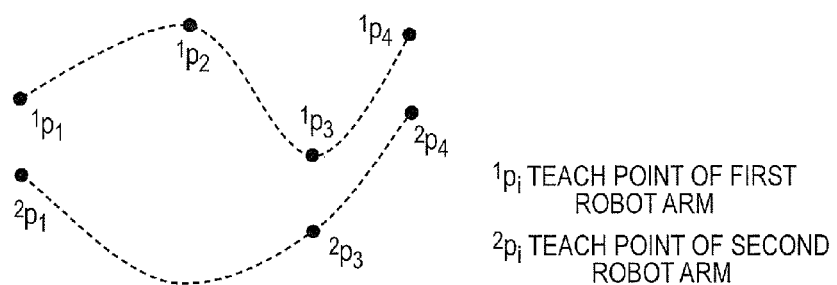
FIG. 7B is a diagram schematically illustrating a teach point sequence with respect to each robot arm.

For example, as illustrated in FIG. 7A, it is assumed that four teach points (1p1, 1p2, 1p3 and 1p4) are present for the first robot arm 200*a*, and three teach points (2p1, 2p3 and 2p4) are present for the second robot arm 200*b*. At these teach points, it is assumed that both the two robot arms 200*a* and 200*b* should pass through the last two teach points at the same time for cooperation.

The teach point numbers that are monotonically increased in each teach point sequence start from number 1, but number 2 is missing in the second robot arm 200*b*. The purpose is to realize synchronous motions in points having the same teach point number in two teach point sequences. That is, the purpose is that the respective robot arms 200*a* and 200*b* pass through the teach points of number 1, 3 and 4 excluding number 2 at the same time.

This may be realized by setting the interpolation function to an unequal spacing spline function. As an example of the unequal spacing spline function, a B spline or the like is known.

The interpolation function of the teach point sequence for the first robot arm is as follows.

$$^1h(s,{}^1p_i)$$

The interpolation function of the teach point sequence for the second robot arm is as follows.

$$^2h(s,{}^2p_i)$$

Both elements are combined, which is expressed as an interpolation function as follows.

$$h(s,p_i) = \begin{bmatrix} {}^1h(s,{}^1p_i) \\ {}^2h(s,{}^2p_i) \end{bmatrix} \quad (16)$$

Subsequent processes are the same as those of the first and second embodiments.

In the third embodiment, it is possible to synchronize the robot arms 200*a* and 200*b* at the places of the same teaching numbers and at the places of the same values s in the above formula, in addition to the effects of the first and second embodiments. That is, it is possible to realize the time optimal control corresponding to the synchronous operations of the plurality of robot arms.

Fourth Embodiment

Figure 8:
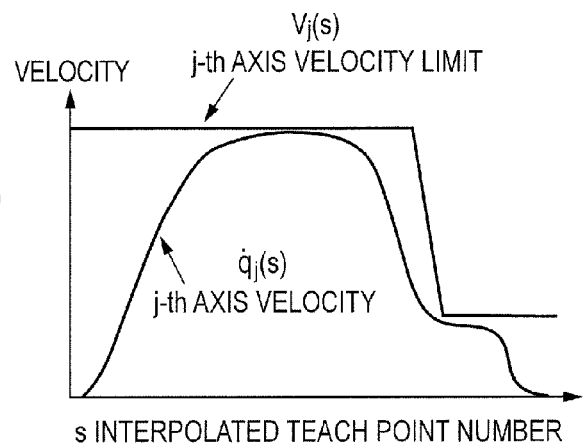
FIG. 8 is a diagram illustrating a processing operation of a constraint condition violation rate calculating part in a robot controlling device according to a fourth embodiment of the present invention.

Next, a robot controlling device according to a fourth embodiment of the invention will be described. FIG. 8 is a diagram illustrating a processing operation of a constraint condition violation rate calculating part in the robot controlling device according to the fourth embodiment of the invention.

In the robot controlling device according to the fourth embodiment, a predetermined constraint value (allowable value) is set to have a different value for each interpolated teach point. A different constraint value is given in advance to each teach point, and a constraint condition violation rate is calculated using the formula (8) according to the value. Since other calculation processes are the same as those of the first to third embodiments, description thereof will be omitted.

In the constraint condition violation rate calculating part 368 according to the first to third embodiments, the ratio of the estimated value and the predetermined allowable value is calculated as the constraint condition violation rate. For example, in the case of the velocity of a j-th joint axis, in the first to third embodiments, the ratio of the estimated velocity of the joint and the allowable velocity Vj that is a constant is calculated as follows.

$$\frac{\dot{q}_j(s)}{V_j}$$

In the third embodiment, the allowable velocity is set to a value changed according to the value of the variable number, and the ratio of the estimated velocity and the allowable velocity changed for each teach point is calculated as follows.

$$\frac{\dot{q}_j(s)}{V_j(s)}$$

The transverse axis illustrated in FIG. 8 is a variable number s indicating an interpolated teach point number, and the variable number s is not limited to an integer in interpolation, but has continuous numbers. FIG. 8 illustrates a state after the calculation of optimizing the pass velocity is completed. Accordingly, the estimated velocity of the joint does not exceed the allowable velocity.

In the fourth embodiment, since it is possible to set the constraint condition for each teach point, the degree of freedom of the constraint condition is further improved compared with the first to third embodiments.

Further, in the fourth embodiment, as illustrated in FIG. 8, the allowable velocity is set to be decreased as the value of the variable number s is increased. Thus, since the joint velocity is reduced as the robot arm is close to the terminal point, it is possible to stably perform the assembly operation using the robot arm.

In the fourth embodiment, the joint velocity constraint has been described, but it is similarly possible to set the allowable values for each teach point, with respect to other constraint conditions such as joint acceleration, jerk, torque, endpoint velocity or endpoint rotating velocity.

As described above, according to the fourth embodiment, it is possible to realize the time optimal control of the robot arm by setting different allowable values for each teach point, in addition to the effects of the first to third embodiments.

Fifth Embodiment

Next, a robot controlling device according to a fifth embodiment of the invention will be described. In the fifth embodiment, the constraint condition includes conditions that the ratio of an estimated motor torque and a predetermined allowable motor torque is within a predetermined constraint range (in the range of ±1), in addition to the conditions in the first to fourth embodiments.

Joints J1 to J6 of the robot arm 200 and electric motors 211 to 216 are connected to each other through reducers 221 to 226. It is possible to calculate an estimated motor torque in each of the electric motors 211 to 216 from a calculation model of the reducers 221 to 226 and the electric motors 211 to 216.

Figure 9A:
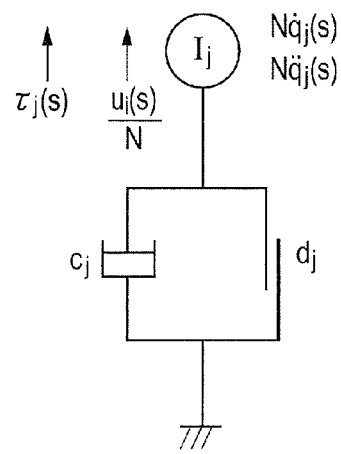
FIG. 9A is a diagram illustrating a model of an electric motor according to the fourth embodiment of the present invention.

The model of the electric motors 211 to 216 is illustrated in FIG. 9A. Here, the following signs are used.

Nj Reduction ratio of j-axis reducer
τj estimated motor torque of j-axis motor
Ij inertia moment of j-axis motor
cj viscous element of j-axis
dj friction element of j-axis The model is specifically expressed as a formula. The estimated velocity, the estimated acceleration of the joint and the estimated torque applied to the joint, used when the constraint condition is calculated, are used. The estimated motor torque of the electric motors 211 to 216 is written in consideration of the reduction ratio Nj as follows.

$$\tau_j(s) = \frac{u_j(s)}{N_j} + I_j N_j \ddot{q}_j(s) + c_j N_j \dot{q}_j(s) + d_j \text{sign}(\dot{q}_j(s)) \qquad (17)$$

On the right side, the first term is a torque applied to the joint, calculated in the formula (6). The second term is a component proportional to the inertia force and acceleration of the motor. The third term is a component proportional to the viscous force and velocity of the motor. The fourth term is a component in which its sign is changed according to the signs of the frictional force and velocity of the motor.

The estimated value calculating part 365 calculates estimated motor torques of the electric motors 211 to 216 in each interpolated teach point q(s) on the basis of the reduction ratios of the reducers 221 to 226, respective pass velocities and respective differential coefficients. In this case, since an estimated torque uj(s) may be calculated from the formulas (4), (5) and (6), the calculation is performed on the basis of each interpolated teach point, each pass velocity (pass velocity, first-order and second-order differential values of the pass velocity) and each differential coefficient (first-order and second-order differential values of the interpolation function).

As obvious from the formula (17), the motor torque on the left side is larger than the torque applied to the joint that is the first term. That is, due to the influence of the inertia or viscosity of the reducer, a larger torque is necessary in the motor.

The estimated motor torque calculated in this way should not exceed the allowable motor torque. The allowable motor torque is generally expressed by a graph referred to as a TN curve in which the transverse axis is the velocity of the motor and the longitudinal axis is the torque of the motor. By adding the ratio of the estimated motor torque and the allowable motor torque to the calculation of the constraint condition violation rate, it is possible to realize the time optimal control in consideration of the motor torque.

Figure 9B:
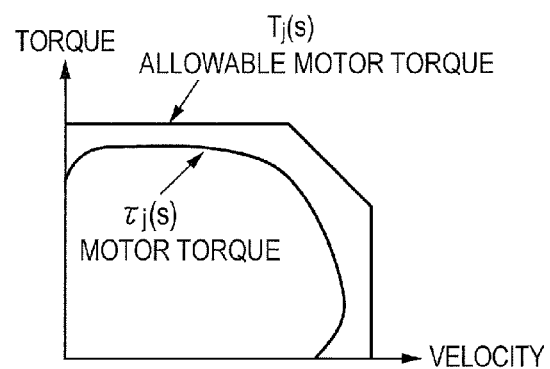
FIG. 9B is a diagram illustrating an allowable motor torque.

FIG. 9B illustrates an example of the TN curve. The allowable motor torque is generally a velocity function. Calculation of the following constraint condition violation rate is added to the constraint condition violation rate calculating part 368 described in FIG. 3.

$$\frac{\tau_j(s)}{T_j}$$

ratio of motor torque $\tau_j(s)$ of j-axis joint of robot arm and allowable torque $T_j$ of motor determined from TN curve of motor In the case of the 6-axis joint robot, j=1 to 6.

FIG. 9B illustrates a situation that the estimated motor torque is entirely in an allowable range. That is, the size of the constraint condition violation rate is 1 or lower. Since parts other than the calculation of the constraint condition violation rate are the same as in the first to fourth embodiments, description thereof will be omitted.

As described above, according to the fifth embodiment, since the constraint condition can be set with respect to the motor torque in addition to the effects of the first to fourth embodiments, it is possible to improve the degree of freedom of the constraint condition compared with the first embodiment. Further, it is possible to realize the time optimal control of the robot arm that satisfies the constraint condition of the allowable motor torque.

The invention is not limited to the above-described embodiments, and various modifications may be made by those skilled in the art in the scope of the invention.

In the first to fifth embodiments, all types of constraint conditions are considered, but these constraint conditions should not necessarily be considered all the time. For example, an operation in which the operation velocity has priority regardless of the estimated endpoint velocity or the estimated endpoint rotational velocity may be realized only by removing the constraint condition of the estimated endpoint velocity or the estimated endpoint rotational velocity from the type of αn(s). In this way, which constraint type is used may be determined in advance. At this time, the differential coefficient calculating part 362 may calculate only necessary differential coefficients. Further, the pass velocity differential coefficient calculating part 364 and the estimated value calculating part 365 may calculate only necessary differential values and estimated values. Particularly, in a case where only the estimated velocity is calculated, the pass velocity differential coefficient calculating part 364 may be omitted.

Further, in the first to fifth embodiments, a case where the articulated robot that is the control target of the robot control apparatus is the robot arm has been described, but the invention may be applied to a case where the articulated robot is a robot hand provided at the tip end of the robot arm.

Further, the respective processing operations according to the above-described embodiments are specifically executed by the CPU 301 that is the calculating unit of the robot control apparatus. Accordingly, a recording medium that records a program that executes the above-mentioned functions may be supplied to the robot control apparatus 300, a computer (CPU or MPU) of the robot control apparatus 300 may read the program stored on the recording medium to be executed. In this case, the program read from the recording medium realizes the above-mentioned functions of the embodiments, and thus, the program and the recording medium that records the program form the invention.

Further, in the above embodiments, a case where the computer-readable recording medium is the ROM 302 and the program 330 is stored in the ROM 302 has been described, but the invention is not limited thereto. The program 330 may be recorded on any recording medium as long as it is a computer-readable recording medium. For example, as the recording medium for supplying the program, the HDD 304, the external storage device 322, the recording disk 331 or the like illustrated in FIG. 2 may be used. Specifically, for example, a flexible disk, hard disk, optical disc, magneto-optical disc, CD-ROM, CD-R, magnetic tape, nonvolatile memory card, ROM or the like may be used as the recording medium.

Further, the program in the above embodiments may be downloaded through a network and may be executed by a computer.

Further, the invention is not limited to a case in which the functions of the embodiments are realized by executing the program codes read by the computer. The invention also includes a case where an OS (operating system) or the like that works on the computer performs a part or all of actual processes according to instructions of the program codes and the functions of the embodiments are realized by the processes.

Further, the program codes read from the recording medium may be written in a memory provided in a function extension board inserted into a computer or a function extension unit connected to the computer. A CPU or the like provided in the function extension board or function extension unit may perform a part or all of the actual processes on the basis of the instructions of the program codes and the functions of the embodiments may be realized by the processes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-050503, filed Mar. 7, 2012, which is hereby incorporated by reference herein in its entirety.

REFERENCE SIGNS LIST 100 robot apparatus
200 robot arm (articulated robot)
201-206 actuator
211-216 electric motor
221-226 reducer
230 servo control device (drive controlling unit)
300 robot controlling device
330 program
331 recording disk (recording medium)
361 interpolation function calculating part (calculating unit)
362 differential coefficient calculating part (calculating unit)
363 temporary setting part (calculating unit)
365 estimated value calculating part (calculating unit)
368 constraint condition violation rate calculating part (calculating unit)
369 time-optimal controlling part (calculating unit)
372 pass velocity function calculating part (calculating unit)
373 position command generating part (calculating unit)

The invention claimed is:

1. A robot controlling device that outputs a position command at a predetermined time interval to a drive controlling unit that controls an operation of each actuator for driving each joint of an articulated robot so that each joint is operated to sequentially follow a plurality of teach points including a teach position of each joint as a vector component, comprising a calculating unit,
  wherein the calculating unit executes:
    an interpolation function calculation process of calculating an interpolation function that passes through a plurality of interpolated teach points for interpolation between the respective teach points;
    a differential coefficient calculation process of calculating each differential coefficient obtained by differentiating each vector component included in each interpolated teach point by a variable number of the interpolation function;
    a temporary setting process of temporarily setting each pass velocity indicating a differential value obtained by time-differentiating the variable number in each interpolated teach point;
    an estimated value calculation process of calculating an estimated velocity of each joint in each interpolated teach point on the basis of each pass velocity and each differential coefficient;
    a time optimal control process of changing the respective pass velocities and minimizing an objective function obtained by integrating reciprocal numbers of the respective pass velocities by the variable number under a constraint condition including a condition that the ratio of the estimated velocity of each joint and a predetermined allowable velocity is within a predetermined constraint range;
    a pass velocity function calculation process of calculating a pass velocity function from each pass velocity obtained in the time optimal control process; and
    a position command generation process of generating the position command by substituting, whenever the pass velocity function is time-integrated by a value of the predetermined time interval, a value of the integration in the variable number in the interpolation function.

2. The robot controlling device according to claim 1, wherein the calculating unit calculates each vector component when the variable number is changed by a minute value smaller than an interval between the respective interpolated teach points with respect to each vector component of each interpolated teach point on the basis of the interpolation function, and calculates each differential coefficient using the calculation result, as the differential coefficient calculation process.

3. The robot controlling device according to claim 1, wherein the calculating unit assigns a teach point number corresponding to a time to each teach point, and calculates the interpolation function by a spline interpolation using the teach point number, as the interpolation function calculation process.

4. The robot controlling device according to claim 1, wherein the allowable velocity is set to a value that is changed according to a value of the variable number.

5. The robot controlling device according to claim 4, wherein the allowable velocity is set to be decreased as the value of the variable number is increased.

6. The robot controlling device according to claim 1, wherein the calculating unit further calculates an estimated acceleration obtained by first-order differentiating the estimated velocity by time with respect to each joint in each interpolated teach point on the basis of each pass velocity and each differential coefficient, as the estimated value calculation process, and
wherein the constraint condition further includes a condition that the ratio of the estimated acceleration and a predetermined allowable acceleration is within a predetermined constraint range.

7. The robot controlling device according to claim 1, wherein the calculating unit further calculates an estimated jerk obtained by second-order differentiating the estimated velocity by time with respect to each joint in each interpolated teach point on the basis of each pass velocity and each differential coefficient, as the estimated value calculation process, and
wherein the constraint condition further includes a condition that the ratio of the estimated jerk and a predetermined allowable jerk is within a predetermined constraint range.

8. The robot controlling device according to claim 1,
wherein the calculating unit further calculates an estimated torque of each joint in each interpolated teach point on the basis of each interpolated teach point, each pass velocity and each differential coefficient, as the estimated value calculation process, and
wherein the constraint condition further includes a condition that the ratio of the estimated torque and a predetermined allowable torque is within a predetermined constraint range.

9. The robot controlling device according to claim 1,
wherein the calculating unit further calculates an estimated tip velocity of the tip of the articulated robot in each interpolated teach point on the basis of each interpolated teach point, each pass velocity and each differential coefficient, as the estimated value calculation process, and
wherein the constraint condition further includes a condition that the ratio of the estimated tip velocity and a predetermined allowable tip velocity is within a predetermined constraint range.

10. The robot controlling device according to claim 1,
wherein the calculating unit further calculates an estimated rotational velocity of the tip of the articulated robot in each interpolated teach point on the basis of each interpolated teach point, each pass velocity and each differential coefficient, as the estimated value calculation process, and
wherein the constraint condition further includes a condition that the ratio of the estimated rotational velocity and a predetermined allowable rotational velocity is within a predetermined constraint range.

11. The robot controlling device according to claim 1,
wherein the actuator includes an electric motor and a reducer,
wherein the calculating unit further calculates an estimated motor torque of the electric motor in each interpolated teach point on the basis of the reduction ratio of the reducer, each pass velocity and each differential coefficient, as the estimated value calculation process, and
wherein the constraint condition further includes a condition that the ratio of the estimated motor torque and a predetermined allowable motor torque is within a predetermined constraint range.

12. A robot apparatus comprising:
an articulated robot; and
the robot controlling device that controls the articulated robot, according to claim 1.

13. A robot control method using a robot controlling device including a calculating unit that generates a position command to be output at a predetermined time interval to a drive controlling unit that controls an operation of each actuator for driving each joint of an articulated robot so that each joint is operated to sequentially follow a plurality of teach points including a teach position of each joint as a vector component, the method comprising:
an interpolation function calculation process of calculating an interpolation function that passes through a plurality of interpolated teach points for interpolation between the respective teach points, by the calculating unit;
a differential coefficient calculation process of calculating each differential coefficient obtained by differentiating each vector component included in each interpolated teach point by a variable number of the interpolation function, by the calculating unit;
a temporary setting process of temporarily setting each pass velocity indicating a differential value obtained by time-differentiating the variable number in each interpolated teach point, by the calculating unit;
an estimated value calculation process of calculating an estimated velocity of each joint in each interpolated teach point on the basis of each pass velocity and each differential coefficient, by the calculating unit;
a time optimal control process of changing the respective pass velocities and minimizing an objective function obtained by integrating reciprocal numbers of the respective pass velocities by the variable number under a constraint condition including a condition that the ratio of the estimated velocity of each joint and a predetermined allowable velocity is within a predetermined constraint range, by the calculating unit;
a pass velocity function calculation process of calculating a pass velocity function from each pass velocity obtained in the time optimal control process, by the calculating unit; and
a position command generation process of generating the position command by substituting, whenever the pass velocity function is time-integrated by a value of the predetermined time interval, a value of the integration in the variable number in the interpolation function, by the calculating unit.

14. A program that causes a computer to execute the respective processes of the robot control method according to claim 13.

15. A computer-readable recording medium on which the program according to claim 14 is recorded.

* * * * *